Patented June 14, 1938

2,120,285

UNITED STATES PATENT OFFICE 2,120,285

SECONDARY BUTYL AND OTHER DIXANTHOGENS

Merrill W. MacAfee, Berkeley, Calif.

No Drawing. Application September 17, 1935, Serial No. 40,930

5 Claims. (Cl. 260—16)

This invention relates to certain new composition matter, more particularly to certain dixanthogens and compositions containing such dixanthogens when made from secondary aliphatic monohydric saturated alcohols containing more than four carbon atoms such as secondary butyl alcohol, the three secondary amyl alcohols and higher secondary alcohols.

Various dixanthogens of the primary alcohols have been known and their industrial application to flotation has been suggested. However, I have succeeded in making secondary dixanthogens, particularly those of the second butyl and secondary amyl alcohols. It has been determined that these dixanthogens, made from the aforementioned secondary alcohols, have very advantageous flotation properties and are more useful in certain flotation operations than primary or secondary xanthates or the dixanthogens heretofore known.

Taking up the dixanthogens of my invention I first make up an aqueous solution, usually about a 10% solution of that alkali metal xanthate from which the dixanthogen is desired. This aqueous solution I clarify by addition of a small quantity of a calcium chloride solution, a precipitate of calcium carbonate and insoluble complex organic carbonates being formed. This precipitate is allowed to settle and the clear liquid decanted. After this the clear liquid is chlorinated by blowing a mixture of chlorine and air through until no further test for xanthate can be secured. The addition of chlorine is immediately discontinued since chlorination of the dixanthogen and its consequent destruction is easily secured by the use of excess chlorine. The resulting product is an emulsion, usually giving an acid reaction. I treat this emulsion with a small amount of a caustic alkali, using six to eight pounds of a caustic alkali in solution to about two hundred pounds of dixanthogen. The dixanthogen is washed free of caustic alkali until it is practically neutral. I have made up the dixanthogen corresponding to sodium and potassium secondary butyl xanthates, the alkali metal xanthates of the three amyl alcohols, diethyl carbinol, methyl propyl carbinol and methyl isopropyl carbinol as well as the secondary hexyl and heptyl xanthates.

In following the course of the reaction by the foregoing process it is to be remarked that it is conducted in an aqueous medium and that the pH is practically always on the alkaline side except possibly during the very last moments of chlorine addition. The products are oily, viscous liquids of a light yellow color. As the percentage of impurities increase they take on more and more of a reddish brown particularly if made with a strong oxidizing agent such as concentrated chlorine, water, chlorine gas or iodine. In fact, the darkest color products have proven themselves of little value in flotation as compared to those products secured by the preferred process herein disclosed.

The materials of the present invention are liquids at ordinary temperatures and are therefore easily fed into flotation machines. Isopropyl dixanthogen, the first dixanthogen in the present series and one well known prior to this invention, is a solid at ordinary temperatures and cannot be fed as readily in the minute quantities usual to flotation operations.

I claim:—

1. As a composition of matter, a dixanthogen of the form

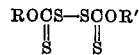

where R and R' are the same or different alkyl hydrocarbon radicals each of at least four carbon atoms and the O atoms are bonded to a C atom to which only a single H atom is bonded, said dixanthogen being liquid at ordinary temperatures.

2. As a composition of matter, a dixanthogen of a secondary monohydric aliphatic saturated unsubstituted alcohol having at least four carbon atoms and normally a liquid at ordinary temperatures.

3. As a composition of matter, secondary butyl dixanthogen normally liquid at ordinary temperatures.

4. As a composition of matter, diethyl carbinol dixanthogen normally liquid at ordinary temperatures.

5. As a composition of matter, secondary amyl dixanthogen normally liquid at ordinary temperatures.

MERRILL W. MACAFEE.